US009424089B2

(12) United States Patent
Gibbs et al.

(10) Patent No.: US 9,424,089 B2
(45) Date of Patent: Aug. 23, 2016

(54) HARDWARE ACCELERATION OF WEB APPLICATIONS

(75) Inventors: Simon J. Gibbs, San Jose, CA (US); Tasneem G. Brutch, Lincoln, CA (US); Won Jeon, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1102 days.

(21) Appl. No.: 13/492,761

(22) Filed: Jun. 8, 2012

(65) Prior Publication Data

US 2013/0191722 A1 Jul. 25, 2013

Related U.S. Application Data

(60) Provisional application No. 61/590,276, filed on Jan. 24, 2012.

(51) Int. Cl.
*G06F 9/46* (2006.01)
*G06F 9/50* (2006.01)
*G06F 9/455* (2006.01)

(52) U.S. Cl.
CPC ......... *G06F 9/5027* (2013.01); *G06F 9/45508* (2013.01); *G06F 2209/5017* (2013.01)

(58) Field of Classification Search
CPC .. G06F 17/00; G06F 9/5027; G06F 9/45508; G06F 2209/5017
See application file for complete search history.

(56) References Cited

U.S. PATENT DOCUMENTS

| | | | | | |
|---|---|---|---|---|---|
| 6,141,793 | A * | 10/2000 | Bryant | ................ | G06F 9/45508 717/115 |
| 6,662,236 | B1 * | 12/2003 | Apte | ................... | G06F 9/45508 717/115 |
| 8,424,004 | B2 * | 4/2013 | Maykov | ............ | G06F 17/30864 718/101 |
| 8,799,914 | B1 * | 8/2014 | Metcalf | ................... | G06F 15/16 712/10 |
| 8,869,162 | B2 * | 10/2014 | Baynast | ................ | G06F 9/5027 718/104 |
| 2005/0165881 | A1 * | 7/2005 | Brooks | ................. | G06F 9/5027 709/200 |
| 2006/0031833 | A1 * | 2/2006 | Huang | ................ | G06F 9/45512 717/178 |
| 2006/0234548 | A1 * | 10/2006 | Qing | ................... | G06F 9/45508 439/587 |
| 2007/0294666 | A1 * | 12/2007 | Papakipos et al. | ........... | 717/119 |
| 2008/0276262 | A1 * | 11/2008 | Munshi et al. | ............... | 719/328 |

(Continued)

OTHER PUBLICATIONS

Juan P. D'Amato et al., "Encrypting video streams using OpenCL code on-demand", [Online], 2011, pp. 1-12, [Retrieved from Internet on Dec. 14, 2015], <https://www.researchgate.net/profile/Juan_DAmato/publication/256013462Encrypting_video_streams_using_OpenCL_code_on-_demand/links/00463528df14382762000000.pdf>.*

(Continued)

*Primary Examiner* — Thuy Dao
*Assistant Examiner* — Ziaul A Chowdhury
(74) *Attorney, Agent, or Firm* — Sherman IP LLP; Kenneth L. Sherman; Hemavathy Perumal (57) ABSTRACT

In a first embodiment of the present invention, a method for enabling hardware acceleration of web applications is provided, comprising: parsing a web page using a scripting engine, wherein the web page necessitates running a web application; accessing one or more Application Program Interfaces (APIs) that provide parallelization, and distribute tasks of the web application among multiple cores of a multi-core central processing unit (CPU) or graphical processing unit (GPU), wherein the accessing uses a compute context class that, when instantiated, creates a compute context object that acts as a bridge between the scripting engine and the one or more APIs; and creating one or more kernels to operate on the multiple cores.

19 Claims, 8 Drawing Sheets

(56) References Cited

U.S. PATENT DOCUMENTS

| | | | | |
|---|---|---|---|---|
| 2009/0158248 | A1* | 6/2009 | Linderman | G06F 9/505 717/106 |
| 2009/0228779 | A1* | 9/2009 | Williamson et al. | 715/233 |
| 2009/0307699 | A1* | 12/2009 | Munshi et al. | 718/102 |
| 2010/0013842 | A1* | 1/2010 | Green et al. | 345/522 |
| 2010/0057831 | A1* | 3/2010 | Williamson | G06F 9/5027 709/203 |
| 2010/0131949 | A1* | 5/2010 | Ferris | G06F 9/5027 718/1 |
| 2011/0161495 | A1* | 6/2011 | Ratering et al. | 709/226 |
| 2012/0110433 | A1* | 5/2012 | Pan et al. | 715/234 |
| 2012/0204162 | A1* | 8/2012 | Nikara | G06F 9/45516 717/148 |
| 2012/0221454 | A1* | 8/2012 | Morgan | G06F 9/5027 705/37 |
| 2013/0097410 | A1* | 4/2013 | Bourges-Sevenier | G06F 17/30899 712/220 |
| 2013/0155048 | A1* | 6/2013 | Swamy | 345/419 |
| 2013/0227521 | A1* | 8/2013 | Bourd et al. | 717/110 |
| 2014/0032707 | A1* | 1/2014 | Doshi | 709/217 |

OTHER PUBLICATIONS

James Moscola et al., "Hardware-Accelerated Parser for Extraction of Metadata in Semantic Network Content", [Online], 2007, pp. 1-8, [Retrieved from Internet on Apr. 9, 2016], <http://faculty.ycp.edu/~jmoscola/papers/moscola_aero07.pdf>.*

Kuen Hung Tsoi et al., "Programming Framework for Clusters with Heterogeneous Accelerators", [Online], 2010, pp. 1-6, {Retrived from Internet on Apr. 9, 2016], <http://forum.gpucomputing.net/sites/default/files/papers/1510/heart10bt.pdf>.*

Lisa Wu et al., "Hardware-Accelerated Range Partitioning", [Online], 2012, pp. 1-12, [Retrieved from Internet on Apr. 9, 2016], <http://academiccommons.columbia.edu/catalog/ac:152590>.*

David Rodriguez Lozano et al., "Reconfigurable Hybrid Architecture for Web Applications", [Online], 2003, pp. 1091-1094, [Retrieved from Internet on Apr. 9, 2016], <http://download.springer.com/static/pdf/149/chp%253A10.1007%252F978-3-540-45234-8_127.pdf>.*

Khronos Group, Feb. 10, 2011. *WebGL Specification*—Version 1.0. URL: https://www.khronos.org/registry/webgl/specs/1.0/, 61 Pages.

Cellier, Fabien, "*WebCLWorker*," Apr. 14, 2011, URL: https://bitbucket.org/tallion/webclworker/wiki/Home, 2 Pages.

Bray, Tim, "*Introducing Renderscript*," Feb. 9, 2011, URL: http://android-developers.blogspot.com/2011/02/introducing-renderscript.html, 2 Pages.

GitHub Inc.,"*RiverTrail Wiki*," URL: https://github.com/RiverTrail/RiverTrail/wiki, downloaded on Jun. 8, 2012, 5 pages.

Herhut, Stephen, "*Building a Computing Highway for Web Applications*," URL: http://blogs.intel.com/research/2011/09/15/pjs/, Sep. 15, 2011, 5 Pages.

ECMA International, "*Standard ECMA-262, ECMAScript Language Specification*," Edition 5.1, Jun. 2011, URL: http://www.ecma-international.org/publications/files/ECMA-ST/Ecma-262.pdf, 258 Pages.

Aarni, Tomi, "GPU Computing on the Web," URL: http://webcl.nokiaresearch.com/index.html, Sep. 7, 2010-Mar. 21, 2012, 4 Pages.

* cited by examiner

FIG. 1: Class Diagram of Hardware Acceleration

```
<script>
    var platforms = WebCL.getPlatforms();

var devices = platforms[0].getDevices(WebCL.DEVICE_TYPE_GPU);

var context = WebCL.createContext({ WebCLDevice: devices[0] } );
    var queue = context.createCommandQueue();
</script>
```

FIG. 2: WebCL Initialization

```
<script id="squareProgram" type="x-kernel">
        __kernel square(
                __global float* input,
                __global float* output,
                const unsigned int count)
        {
                int i = get_global_id(0);
                if(i < count)
                        output[i] = input[i] * input[i];
        }
</script>

<script>
        var programSource = getProgramSource("squareProgram");   //JavaScript function using DOM APIs
        var program = context.createProgram(programSource);
        program.build();
        var kernel = program.createKernel("square");
</script>
```

FIG. 3: Example code for kernel creation

- From <img> or <canvas> or <video>

```
<script>
    var canvas = document.getElementById("aCanvas");
    var clImage = context.createImage(WebCL.MEM_READ_ONLY, canvas);
        // format, size from element
</script>
```

- From Uint8Array()

```
<script>
    var bpp = 4;  // bytes per pixel
    var pixels = new Uint8Array(width * height * bpp);
    var pitch = width * bpp;
    var clImage = context.createImage(WebCL.MEM_READ_ONLY,
        {channelOrder:WebCL.RGBA, channelType:WebCL.UNORM_INT8,
        size:[width, height], pitch:pitch } );
</script>
```

FIG. 4: WebCL image creation examples

```
<script>
    ...
    var inputBuf  = context.createBuffer(WebCL.MEM_READ_ONLY,
                            Float32Array.BYTES_PER_ELEMENT * count);
    var outputBuf = context.createBuffer(WebCL.MEM_WRITE_ONLY,
                            Float32Array.BYTES_PER_ELEMENT * count);

var data = new Float32Array(count);
    // populate data ...
    queue.enqueueWriteBuffer(inputBuf, data, true);      // last argument indicates API is blocking kernel.setKernelArg(0, inputBuf);
    kernel.setKernelArg(1, outputBuf);
    kernel.setKernelArg(2, count, WebCL.KERNEL_ARG_INT);

var workGroupSize = kernel.getWorkGroupInfo(devices[0], WebCL.KERNEL_WORK_GROUP_SIZE);
    queue.enqueueNDRangeKernel(kernel, [count], [workGroupSize]);

queue.finish();
    // this API blocks queue.enqueueReadBuffer(outputBuf, data, true);          // last argument indicates API is blocking
</script>
```

FIG. 5: Code example

HARDWARE ACCELERATION OF WEB APPLICATIONS

CROSS REFERENCE TO RELATED APPLICATIONS

This application claims the benefit of priority under 35 U.S.C. §119(e) to U.S. Provisional Patent Application No. 61/590,276, filed on Jan. 24, 2012, which is incorporated herein by reference in its entirety for all purposes.

BACKGROUND OF THE INVENTION

1. Field of the Invention

The present invention relates generally to computing devices. More specifically, the present invention relates to hardware acceleration of web applications.

2. Description of the Related Art

A general purpose graphics processing unit (GPU) is a type of processor that has been specifically designed to perform compute intensive and graphics related computations. They can rapidly manipulate and alter memory in such a way so as to accelerate both image and non-image related computations. GPUs are used in embedded systems, mobile phones, personal computers, workstations, and game consoles, among other devices. Modern GPUs are very efficient at manipulating computer graphics and for compute intensive problems, and their highly parallel structure makes them more effective than general-purpose CPUs for algorithms where processing of large blocks of data is done in parallel.

Other high performance processors, such as general purpose multi-core central processing units (CPUs) have also been finding their way into more and more devices. However, the performance and power efficiency of GPUs surpasses general purpose CPUs.

Web applications, such as those commonly run on smart phones and computers operating web browsers, rely on the standard processor on whatever device they are running to execute the processes and computations required by the web applications. As web applications become more and more compute and graphics intensive, consumers are demanding better and better processing times for the applications.

Open Computing Language (OpenCL) is a framework for writing programs that execute across heterogeneous platforms consisting of central processing unit (CPUs), graphics processing unit (GPUs), and other processors and accelerators. Software can then be designed to use OpenCL to facilitate the use of GPUs or multi-core processors to process sections of the software and for parallelization. The problem with this approach, however, is that it is difficult to extend such functionality to a broad scope of web applications. Unlike more traditional software, web applications essentially are two pieces of application software—the application itself, and the web browser that runs the application. While individual web application designers can design their web applications specifically to utilize OpenCL, this utilization would only apply to their own web application, and not to other web applications run by the browser. Requiring individual web application designers, many of whom are smaller companies or even individuals in the smart phone age, to design applications using OpenCL is a significant impediment to its acceptance. Additionally, support for the use of a GPU through a browser, to run a web application helps not only that particular web application, but also other applications running on the computing device, which suddenly will have more processing power available.

As such, what is needed is a solution that allows for a higher level of abstraction on top of parallelization APIs such as OpenCL, that can be utilized by a web browser and apply to any web application that the web browser runs.

SUMMARY OF THE INVENTION

In a first embodiment of the present invention, a method for enabling hardware acceleration of web applications is provided, comprising: parsing a web page using a scripting engine, wherein the web page necessitates running a web application; accessing one or more parallelization Application Program Interfaces (APIs), that distribute tasks of the web application among multiple cores of a multi-core central processing unit (CPU) or graphical processing unit (GPU), wherein the accessing uses a compute context class that, when instantiated, creates a compute context object that acts as a bridge between the scripting engine and the one or more APIs; and creating one or more kernels to operate on the multiple cores.

In a second embodiment of the present invention, a method for enabling hardware acceleration of web applications is provided, comprising: providing a scripting language binding to an open standard for APIs for accelerating web applications by distributing tasks among multiple cores of multi-core CPUs and GPUs; and providing a modified browser containing support for the open standard as well as support for the binding.

In a third embodiment of the present invention, a web browser operable on a computer having access to multiple cores of a multi-core CPU or GPU is provided, the web browser comprising: a user interface front end; a scripting language engine; a scripting language engine binder; a Document Object Model (DOM) interpreter; a parser; a loader; a platform port including a port to an open standard for APIs for accelerating web applications by distributing tasks among multiple cores of multi-core CPUs and GPUs; and a hardware acceleration core configured to access the one or more APIs through the port to the open standard, wherein the accessing uses a compute context class that, when instantiated, creates a compute context object that acts as a bridge between the scripting engine and the one or more APIs; and create one or more kernels to operate on the multiple cores.

In a fourth embodiment of the present invention, an apparatus for enabling hardware acceleration of web applications, comprising: means for providing a scripting language binding to an open standard for parallelization APIs for accelerating web applications by distributing tasks among multiple cores of multi-core CPUs and GPUs; and means for providing a modified browser containing support for the open standard as well as support for the binding.

In a fifth embodiment of the present invention, a program storage device readable by a machine tangibly embodying a program of instructions executable by the machine to perform a method for enabling hardware acceleration of web applications is provided, the method comprising: parsing a web page using a scripting engine, wherein the web page necessitates running a web application; accessing one or more Application Program Interfaces (APIs) that distribute tasks of the web application among multiple cores of a multi-core central processing unit (CPU) or graphical processing unit (GPU), wherein the accessing uses a compute context class that, when instantiated, creates a compute context object that acts as a bridge between the scripting engine and the one or more APIs; and creating one or more kernels to operate on the multiple cores.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, the high-performance computation capabilities of multi-core CPUs and programmable GPUs are made easily accessible to web applications, resulting in significant performance gains. The approach outlined in this document may be used as an open standard that can be implemented by any web browser. It is a cross-platform technology, independent of the operating system and native libraries on the operating device. Exposing multi-core or graphics-core computation to web applications fits well with the strategy of developing web-centric platforms for future mobile devices.

In an embodiment of the present invention, the OpenCL standard is leveraged by using a JavaScript API for interacting between a web application and OpenCL. As such, this embodiment can be thought of as being built "on top of" OpenCL. It should be noted, however, that this is merely one embodiment of the present invention, and other embodiments are contemplated that do not utilize OpenCL, which may utilize other APIs providing access to parallelization and/or hardware acceleration.

In an embodiment of the present invention, a single namespace is utilized, where there is a single JavaScript object used to access hardware acceleration through OpenCL. Error handling for hardware acceleration is performed by calling an error reporting and handling module, and checking for errors received from OpenCL. Direct access is provided to the OpenCL initialization APIs.

Furthermore, blocking for kernel execution commands is deliberately not supported in an embodiment of the present invention, to prevent against the potential of long running kernels resulting in denial of service, by hindering interactivity of JavaScript applications. For example, in contrast to the OpenCL clFinish( ) API, which blocks until all previously queued OpenCL commands in a command queue are issued to the associated device and completed, a clFinish( ) command in accordance with this embodiment of the present invention takes a callback function provided by the user. Additionally, in the interest of security and portability, only kernel executables built from source code are allowed as part of the web pages. Program executables using pre-compiled binary are not permitted.

WebKit is a layout engine designed to allow a web browser/runtime to render web pages and execute web widgets and applications. The WebKit engine includes three main components, WebCore, JavaScriptCore, and WebKit. WebCore is a layout, rendering, and Document Object Model (DOM) library for HTML and Scalable Vector Graphics (SVG). JavaScriptCore is a JavaScript engine that interprets or Just-in-time (JIT) compiles and executes JavaScript. WebKit wraps WebCore and JavaScriptCore to provide a common application programming interface (API) to browser or application developers. In an embodiment of the present invention, WebKit is utilized as part of the implementation. This document will describe the present invention in terms of WebKit, although one of ordinary skill in the art will recognize that other implementations are possible as well.

Figure 1:
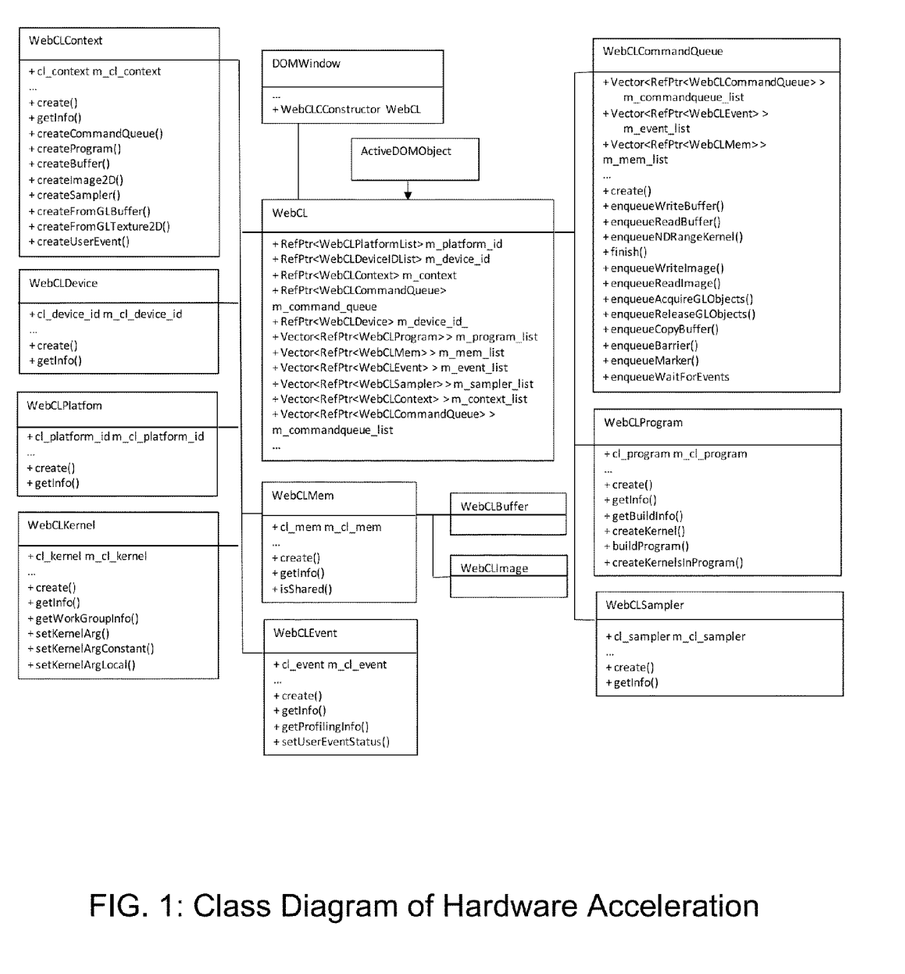
FIG. 1 is a class diagram of hardware acceleration using WebKit in accordance with an embodiment of the present invention.

WebKit is used as a codebase for the hardware acceleration implementation for web applications. A JavaScript binding is provided for OpenCL to web applications by modifying the internal binding mechanism implemented in WebCore. FIG. 1 is a class diagram of hardware acceleration using WebKit in accordance with an embodiment of the present invention.

The present invention may be known as Web Acceleration, and will be referred to as such throughout this document.

The bridge between JavaScript and OpenCL is the WebCLComputeContext class. A WebCLComputeContext object is associated with the current browsing context, specifically Window object, by being inherited from ActiveDOMObject object. WebCLComputeContext object is a main object in the design and implementation of Web Acceleration, which defines and implements most of the JavaScript APIs which are used by web application developers. Other hardware acceleration objects such as WebCLContext, WebCLDevice, WebCLPlatform, WebCLKernel, WebCLMemObject, WebCLCommandQueue, etc. maintain native OpenCL objects as member variables and are being used as arguments of Hardware Acceleration APIs defined in WebCLComputeContext object.

Figure 2:
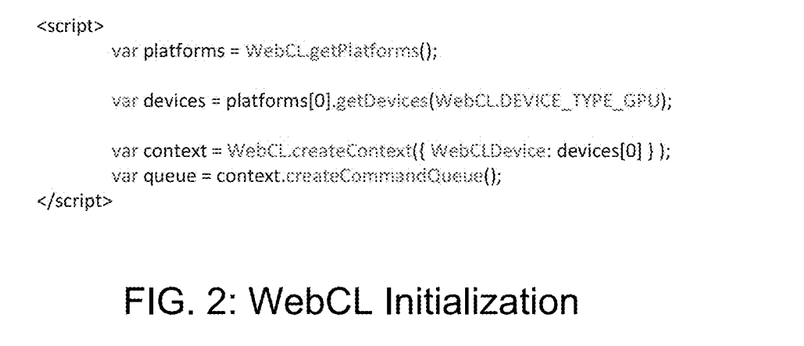
FIG. 2 is a diagram illustrating the code snippet for initialization in accordance with this embodiment of the present invention.

During initialization, OpenCL APIs are accessed from JavaScript through the WebCLComputeContext class. The compute context for hardware acceleration is initialized by creating a new WebCLComputeContext object. FIG. 2 is a diagram illustrating the code snippet for initialization in accordance with this embodiment of the present invention.

Figure 3:
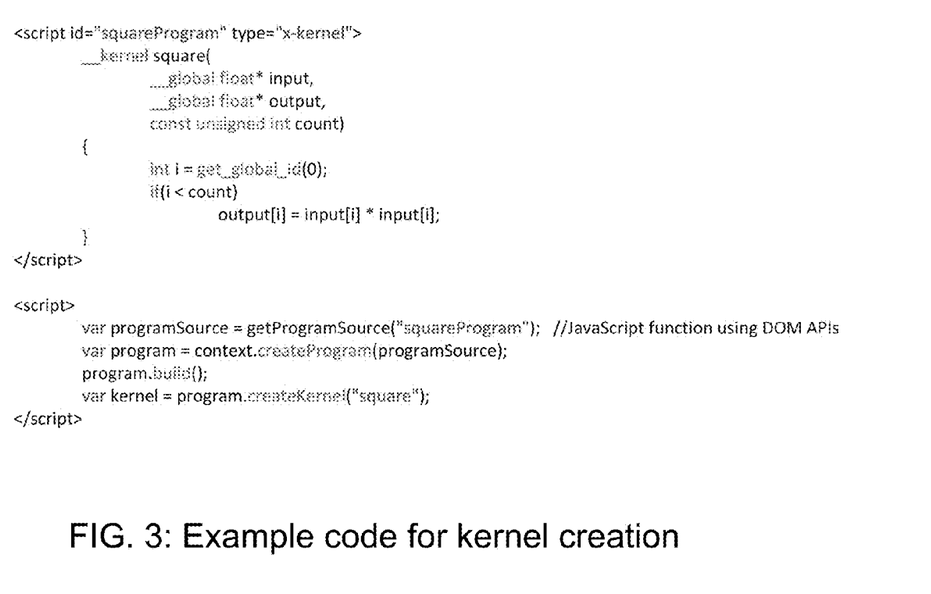
FIG. 3 is a diagram illustrating the example code related to kernel creation in accordance with this embodiment of the present invention.

For kernel creation, the source code of the kernel can be described in a C99-like language and the corresponding program is created and built by calling createProgramWithSource( ) and buildProgram( ) respectively. The actual kernel is then created by createKernel( ). FIG. 3 is a diagram illustrating the example code related to kernel creation in accordance with this embodiment of the present invention.

Figure 4:
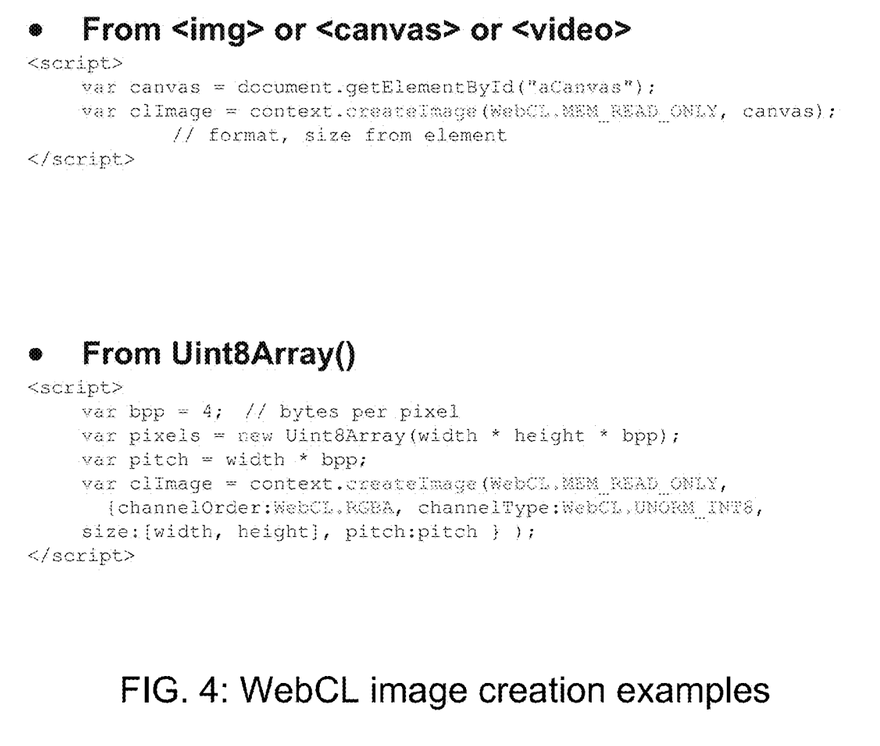
FIG. 4 illustrates several examples of this embodiment of the present invention.

Memory objects can be created from different objects in JavaScript, such as canvas image, JavaScript image, and Typed Arrays. FIG. 4 illustrates several examples of this embodiment of the present invention.

Figure 5:
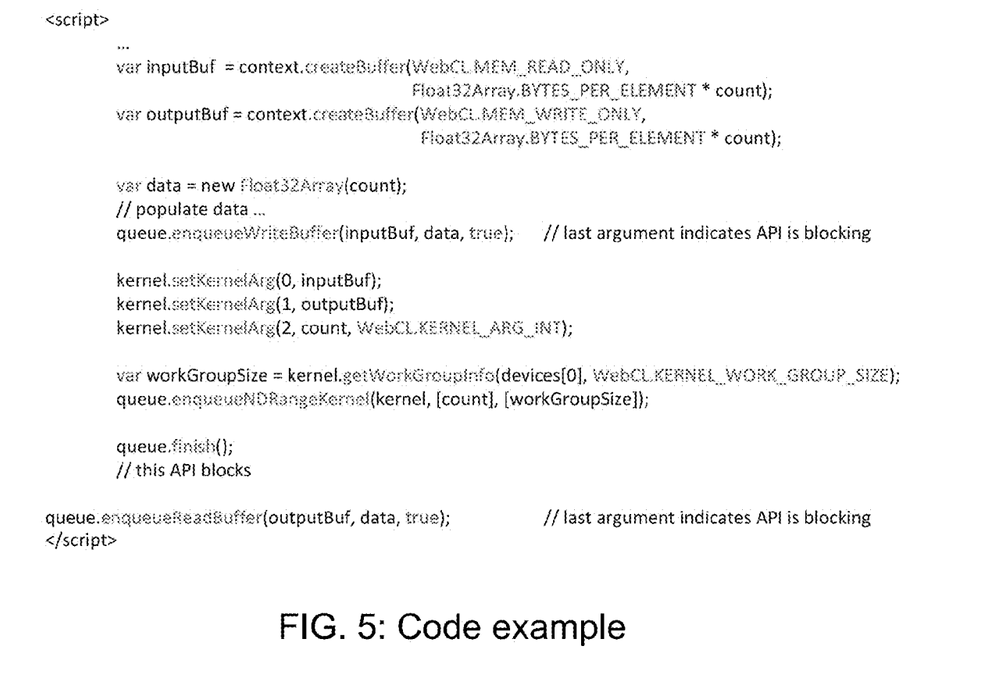
FIG. 5 is a diagram illustrating an example of the code for such a binding in accordance with this embodiment of the present invention.

For kernel execution, the hardware acceleration APIs cl.createBuffer( ) cl.enqueueWriteBuffer( ) cl.setKernelArg( ) cl.getKernelWorkGroupInfo( ) and cl.enqueNDRangeKernel( ) APIs provide bindings to the corresponding OpenCL APIs createBuffer( ) enqueueWriteBuffer( ) setKernelArg( ) getKernelWorkGroupInfo( ) and enqueueNDRangeKernel( ) for creating buffer objects, writing the host memory to GPU memory, setting values for kernel parameters, returning work group related information such as size, and initiation of kernel execution, respectively. FIG. 5 is a diagram illustrating an example of the code for such a binding in accordance with this embodiment of the present invention.

For hardware acceleration cleanup, the hardware acceleration APIs cl.releaseMemObject(Input), cl.releaseProgram(program), cl.releaseKernel( ) cl.releaseCommandQueue( ) and cl.releaseContext( ) APIs provide bindings to the OpenCL APIs releaseMemObject( ) releaseProgram( ) releaseKernel( ) releaseCommandQueue( ) and releaseContrext( ) for deleting memory, program, kernel, command queue, and context objects, respectively.

For interoperation with WebGL, the hardware acceleration and WebGL may be used in conjunction, in two configurations, both of which utilize the interoperability provided between OpenCL and OpenGL. These modes are (a) Pre-processing, where hardware acceleration provides inputs to WebGL, and (b) Post-processing, where WebGL provides input to hardware acceleration. In addition, other configurations, or a combination of above may also be possible.

The application creates a hardware acceleration context via the cl.createSharedContext( ) API, which is used to create context for hardware. The application can then create a hardware acceleration memory object (buffer) that is associated with a WebGL buffer via the createFromGLBuffer( ) API. When the hardware acceleration processes the buffer, it is acquired and then released by calling enqueueAcquireGLObjects( ) and enqueueReleaseGLObjects( ) respectively.

Figure 6:
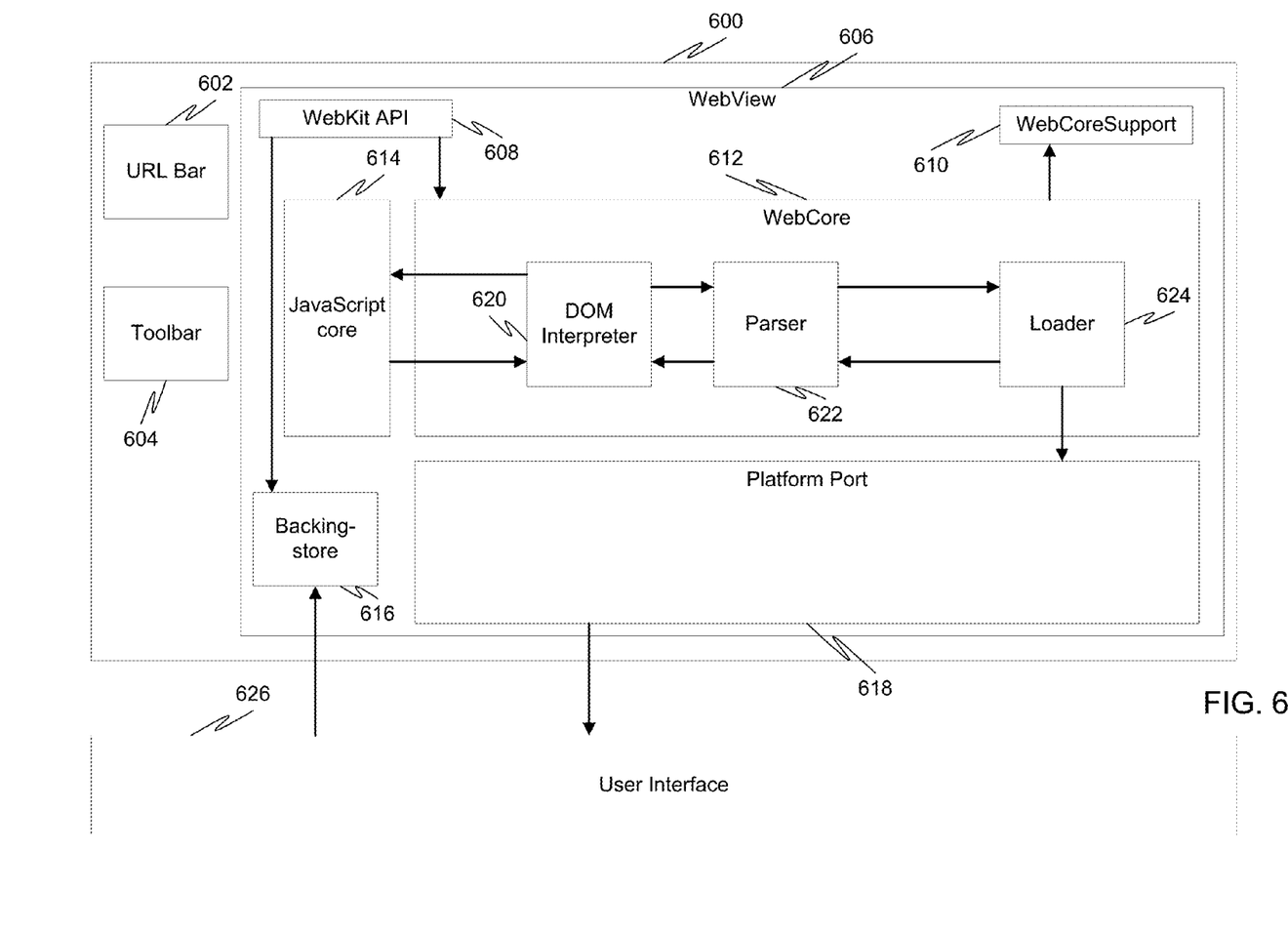
FIG. 6 is a block diagram illustrating browser architecture using a JavaScript or similar application.

FIG. 6 is a block diagram illustrating browser architecture using a JavaScript or similar application. The browser 600 includes a URL bar 602 and a toolbar 604, as well as a webview component 606. The webview component 606 includes a WebkitAPI 608, WebCore support 610, and a WebCore 612. Other components include a JavaScript core 614, backing store 616, and platform port 618. The WebCore 612 includes a DOM interpreter 620, a parser 622, and a loader 624.

JavaScript pages are parsed using the JavaScript core 614. A JavaScript engine in the JavaScript core 614 then performed interpretation, including byte-code generation, machine code generation, JavaScript execution, and garbage collection. The DOM interpreter 620 then parses the web page, creates DOM trees, and loads resources. After this is done, compute image pixels are drawn on the screen using a user interface 626.

Figure 7:
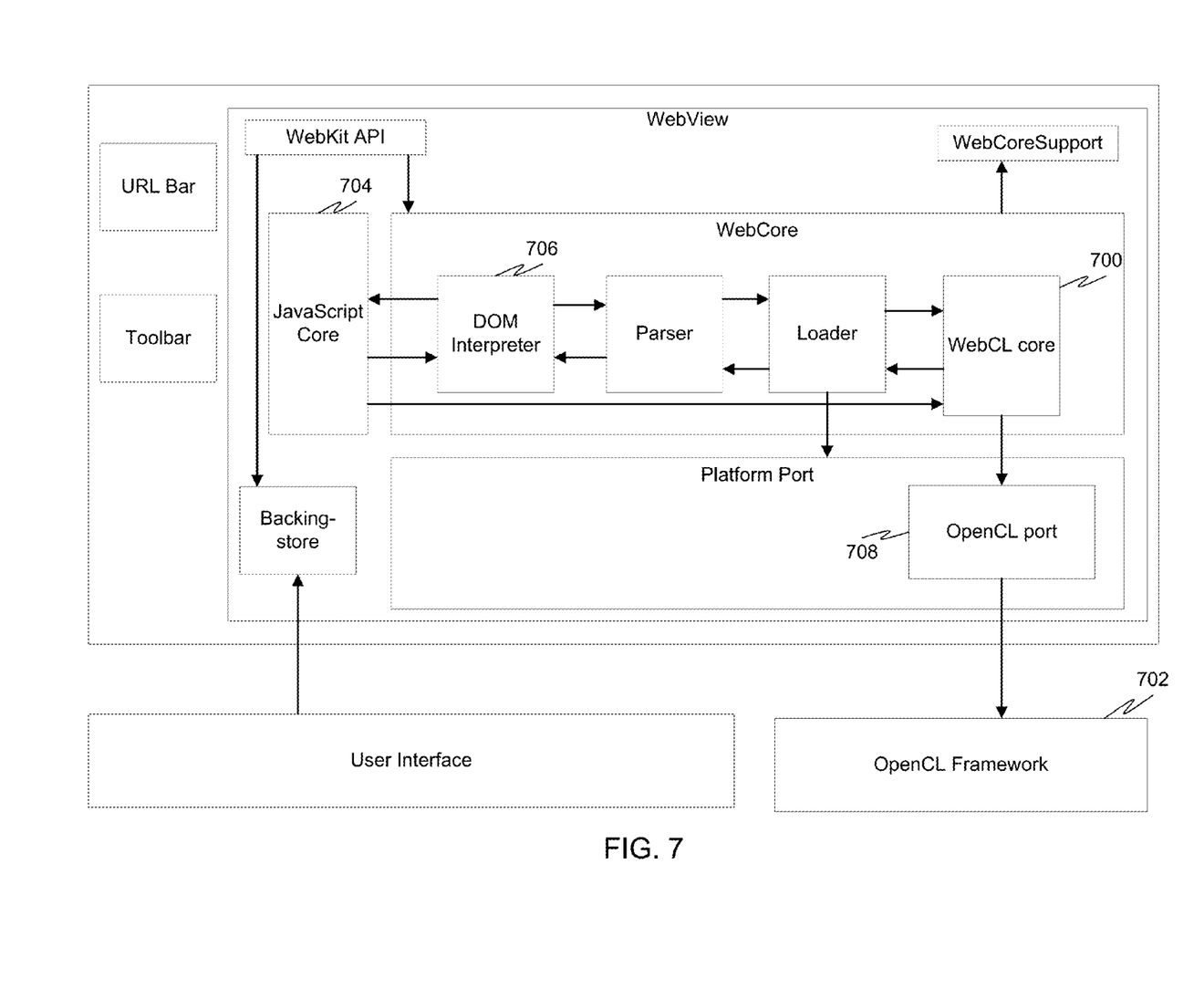
FIG. 7 is a block diagram illustrating browser architecture using an application with Web Acceleration, in accordance with an embodiment of the present invention.

FIG. 7 is a block diagram illustrating browser architecture using a Web accelerated application, in accordance with an embodiment of the present invention. In this embodiment, an additional Web AccelerationCore 700 is added to the architecture of FIG. 6 to allow for communication with an OpenCL Framework 702. As such, JavaScript pages for Web Acceleration are parsed by the JavaScript engine 704, and the JavaScript engine also performs interpretation, including byte-code generation, machine code generation, JavaScript execution, and garbage collection. The DOM interpreter 706 then parses the web page, creates DOM trees, and loads resources. The JavaScript binding code then calls the OpenCL port 708 to perform initialization for Web Acceleration, kernel/buffer creation, kernel executions, results read-backs, and release resource operations. The Web Acceleration Core 700 then interfaces with the OpenCL Framework 702 through the OpenCL port 708. The OpenCL Framework 702 can then perform various actions to establish the tasks on different CPU and GPU devices, including the creation and compilation of the kernel for the target device, the creation of data and arguments for kernels and memory objects, and the execution of the kernel and reading back of the results. Kernels can then be executed in the appropriate multi-core CPU or GPUs.

Figure 8:
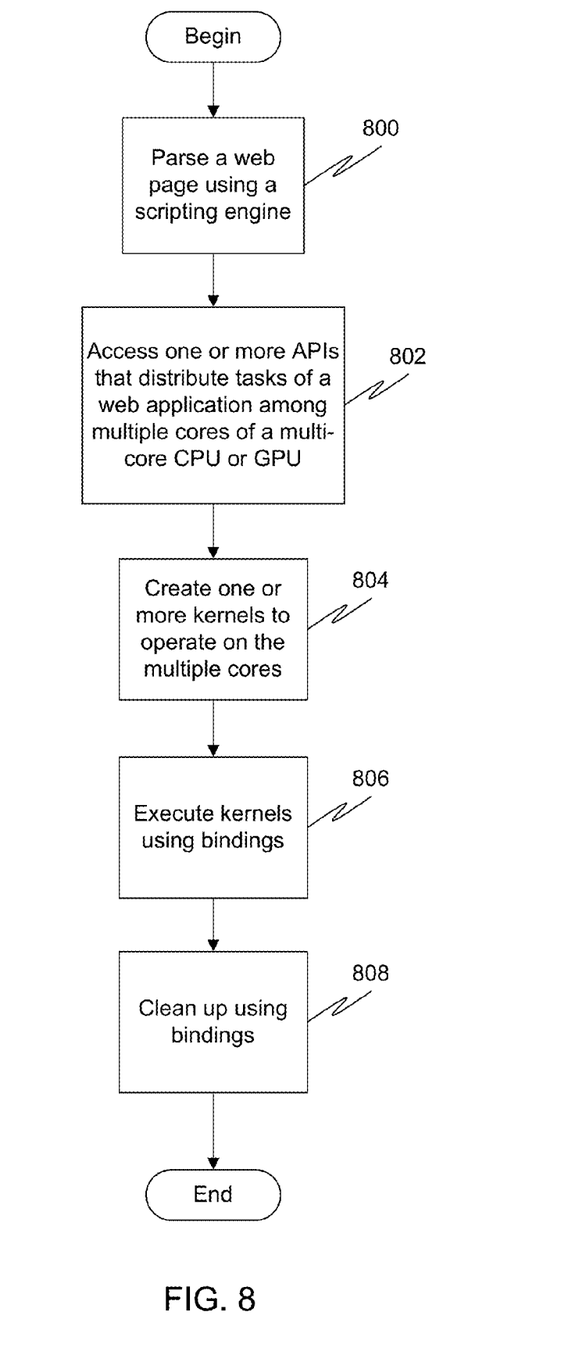
FIG. 8 is a flow diagram illustrating a method for enabling hardware acceleration of web applications in accordance with an embodiment of the present invention.

FIG. 8 is a flow diagram illustrating a method for enabling hardware acceleration of web applications in accordance with an embodiment of the present invention. At 800, a web page is parsed using a scripting engine. The web page necessitates running a web application. At 802, one or more APIs that distribute tasks of the web application among multiple cores of a multi-core CPU or GPU are accessed. The accessing involves using a compute context class that, when instantiated, creates a compute context object that acts as a bridge between the scripting engine and the one or more APIs. At 804, one or more kernels are created to operate on the multiple cores. At 806, the kernels are executed using bindings. At 808, clean up is performed using bindings.

It should be noted that to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for enabling hardware acceleration of web applications, comprising:
   parsing a web page using a scripting engine, wherein the web page necessitates running a web application;
   instantiating a class to create a hardware acceleration object that acts as a bridge between the scripting engine and one or more Application Program Interfaces (APIs) that distribute tasks of the web application among multiple cores of a multi-core central processing unit (CPU) or graphical processing unit (GPU); and
   accessing the one or more APIs through the hardware acceleration object to create one or more kernels to operate on the multiple cores;
   wherein the class comprises a compute context class;
   wherein the hardware acceleration object comprises a compute context object; and
   wherein the one or more APIs are one or more OpenCL APIs.

2. The method of claim 1, wherein the scripting engine is a JavaScript engine.

3. The method of claim 1 further comprising:
   utilizing one or more Web Acceleration APIs that are bound to the one or more OpenCL APIs to execute the one or more kernels.

4. The method of claim 1, further comprising:
   utilizing one or more Web Acceleration APIs that are bound to the one or more OpenCL APIs to clean up after hardware acceleration.

5. A method for enabling hardware acceleration of web applications, comprising:
   providing a scripting language binding to an open standard for one or more Application Program Interfaces (APIs) configured to accelerate web applications by distributing tasks among multiple cores of a multi-core central processing unit (CPU) or graphical processing unit (GPU); and
   providing a modified browser comprising support for the open standard as well as support for the scripting language binding;
   wherein the scripting language binding is configured to call a port to the open standard to perform initialization for hardware acceleration of a web application, and the initialization comprises instantiating a class to create a hardware acceleration object that acts as a bridge between a scripting language engine of the modified browser and the one or more APIs;
   wherein the class comprises a compute context class;
   wherein the hardware acceleration object comprises a compute context object; and
   wherein the one or more APIs are one or more OpenCL APIs.

6. The method of claim 5, wherein the scripting language binding is a JavaScript binding.

7. The method of claim 5, wherein the open standard is OpenCL.

8. A web browser stored in a non-transitory computer readable medium operable on a computer having access to multiple cores of a multi-core central processing unit (CPU) or graphical processing unit (GPU), the web browser comprising:
   a scripting language engine;
   a scripting language engine binder;
   a platform port comprising a first port to an open standard for one or more Application Program Interfaces (APIs) configured to accelerate web applications by distributing tasks among the multiple cores, wherein, in response to a call from the scripting language engine binder to perform initialization for hardware acceleration of a web application, the first port is configured to instantiate a class to create a hardware acceleration object that acts as a bridge between the scripting language engine and the one or more APIs; and
   a Web Acceleration core configured to access the one or more APIs through the first port to the open standard to cause creation of one or more kernels to operate on the multiple cores;
   wherein the class comprises a compute context class;
   wherein the hardware acceleration object comprises a compute context object; and
   wherein the open standard is OpenCL.

9. The web browser of claim 8, further comprising:
   a user interface front end, wherein the user interface front end is configured to compute one or more image pixels and draw the one or more image pixels on an electronic display screen.

10. The web browser of claim 8, wherein the scripting language engine is a JavaScript engine.

11. The web browser of claim 8, wherein the scripting language engine binder is a JavaScript engine binder.

12. An apparatus for enabling hardware acceleration of web applications, comprising:
    a processor; and
    a memory storing instructions that when executed by the processor cause the processor to perform operations including:
      parsing a web page using a scripting engine, wherein the web page necessitates running a web application;
      instantiating a class to create a hardware acceleration object that acts as a bridge between the scripting engine and one or more Application Program Interfaces (APIs) configured to distribute tasks of the web application among multiple cores of a multi-core central processing unit (CPU) or graphical processing unit (GPU) to enable hardware acceleration of the web application; and
      accessing the one or more APIs through the hardware acceleration object to create one or more kernels to operate on the multiple cores;
      wherein the class comprises a compute context class;
      wherein the hardware acceleration object comprises a compute context object; and
      wherein the one or more APIs are one or more OpenCL APIs.

13. The apparatus of claim 12, wherein the scripting engine is a JavaScript engine.

14. The apparatus of claim 12, wherein the operations further include:
utilizing one or more Web Acceleration APIs that are bound to the one or more OpenCL APIs to execute the one or more kernels.

15. The apparatus of claim 12 wherein the operations further include:
utilizing one or more Web Acceleration APIs that are bound to the one or more OpenCL APIs to clean up after hardware acceleration.

16. An apparatus for enabling hardware acceleration of web applications, comprising:
a processor; and
a memory storing instructions that when executed by the processor cause the processor to perform operations including:
providing a scripting language binding to an open standard for one or more Application Program Interfaces (APIs) configured to accelerate web applications by distributing tasks among multiple cores of a multi-core central processing unit (CPU) or graphical processing unit (GPU); and
providing a modified browser comprising support for the open standard as well as support for the scripting language binding;
wherein the scripting language binding is configured to call a port to the open standard to perform initialization for hardware acceleration of a web application, and the initialization comprises instantiating a class to create a hardware acceleration object that acts as a bridge between a scripting language engine of the modified browser and the one or more APIs;
wherein the class comprises a compute context class;
wherein the hardware acceleration object comprises a compute context object; and
wherein the one or more APIs are one or more OpenCL APIs.

17. The apparatus of claim 16, wherein the scripting language is JavaScript.

18. The apparatus of claim 16, wherein the open standard is OpenCL.

19. A computer-readable storage medium embodied thereon instructions being executable by at least one processor to perform a method for enabling hardware acceleration of web applications, the method comprising:
parsing a web page using a scripting engine, wherein the web page necessitates running a web application;
instantiating a class that enables hardware acceleration to create a hardware acceleration object that acts as a bridge between the scripting engine and one or more Application Program Interfaces (APIs) configured to distribute tasks of the web application among multiple cores of a multi-core central processing unit (CPU) or graphical processing unit (GPU); and
accessing the one or more APIs through the hardware acceleration object to create one or more kernels to operate on the multiple cores;
wherein the class comprises a compute context class;
wherein the hardware acceleration object comprises a compute context object; and
wherein the one or more APIs are one or more OpenCL APIs.

* * * * *